(12) United States Patent
Berg

(10) Patent No.: US 11,261,102 B2
(45) Date of Patent: Mar. 1, 2022

(54) REVERSE OSMOSIS PREFILTER SYSTEM

(71) Applicant: Jacob H. Berg, Fort Myers, FL (US)

(72) Inventor: Jacob H. Berg, Fort Myers, FL (US)

(*) Notice: Subject to any disclaimer, the term of this patent is extended or adjusted under 35 U.S.C. 154(b) by 0 days.

(21) Appl. No.: 17/245,329

(22) Filed: Apr. 30, 2021

(65) Prior Publication Data
US 2021/0340026 A1 Nov. 4, 2021

Related U.S. Application Data

(60) Provisional application No. 63/018,706, filed on May 1, 2020.

(51) Int. Cl.
*C02F 1/00* (2006.01)
*C02F 1/44* (2006.01)
(Continued)

(52) U.S. Cl.
CPC .............. *C02F 1/001* (2013.01); *B01D 29/52* (2013.01); *B01D 61/025* (2013.01); *B01D 61/04* (2013.01); *B01D 61/08* (2013.01); *C02F 1/441* (2013.01); *B01D 2201/16* (2013.01); *B01D 2201/182* (2013.01); *B01D 2201/29* (2013.01); *B01D 2311/04* (2013.01); *B01D 2311/2649* (2013.01); *B01D 2313/18* (2013.01); *B01D 2313/243* (2013.01); *C02F 2103/007* (2013.01); *C02F 2103/08* (2013.01); *C02F 2201/005* (2013.01); *C02F 2201/006* (2013.01); *C02F 2209/40* (2013.01); *C02F 2301/046* (2013.01)

(58) Field of Classification Search
CPC .... C02F 1/001; C02F 1/441; C02F 2301/046; C02F 2103/007; C02F 2103/08; C02F 2201/005; C02F 2201/006; C02F 2209/40; C02F 1/008; C02F 1/44; B01D 61/025; B01D 29/52; B01D 61/04; B01D 61/08; B01D 2313/18; B01D 2311/04; B01D 2201/182; B01D 2201/16; B01D 2313/243; B01D 2311/2649; B01D 2201/29; B01D 61/12; B01D 61/16; B01D 61/22; B01D 29/0047; B01D 29/005; B01D 29/50; B01D 29/60; B01D 29/603; B01D 29/88; B01D 29/90; B01D 29/92; B01D 35/157; B01D 35/027; B01D 2201/162; B01D 2201/20; B01D 35/0273; B01D 35/0276
See application file for complete search history.

(56) References Cited

U.S. PATENT DOCUMENTS 5,972,216 A * 10/1999 Acernese ............... C02F 9/005
210/253
6,001,244 A * 12/1999 Salter ...................... B01D 65/02
210/104
(Continued)

*Primary Examiner* — Joseph W Drodge
(74) *Attorney, Agent, or Firm* — William E. Noonan

(57) ABSTRACT

A reverse osmosis prefilter system includes a recirculation chamber for accommodating one or more prefilter cartridges. The recirculation chamber is communicably interconnected to an inline water source and an RO filtration membrane. The recirculation chamber has a recirculation outlet and inlet which are communicably interconnected by an offline pump that recirculates prefiltered water repeatedly through the recirculation chamber and prefilter cartridges to remove particulates from the source water prior to delivery to the reverse osmosis filter membrane.

17 Claims, 1 Drawing Sheet

(51) Int. Cl.
B01D 61/02 (2006.01)
B01D 61/08 (2006.01)
B01D 61/04 (2006.01)
B01D 29/52 (2006.01)
*C02F 103/08* (2006.01)
*C02F 103/00* (2006.01)

(56) References Cited

U.S. PATENT DOCUMENTS

| | | | |
|---|---|---|---|
| 6,270,671 B1* | 8/2001 | Shorr | B01D 61/16 |
| | | | 210/137 |
| 7,371,319 B2* | 5/2008 | Wood | A61K 9/08 |
| | | | 210/149 |
| 9,102,544 B2* | 8/2015 | Merryman | C02F 1/44 |
| 9,422,173 B1* | 8/2016 | Spiegel | C02F 1/461 |
| 2003/0094406 A1* | 5/2003 | Smith | B01D 61/12 |
| | | | 210/96.2 |
| 2004/0168970 A1* | 9/2004 | Marheine | B01D 29/54 |
| | | | 210/323.1 |
| 2007/0138096 A1* | 6/2007 | Tarr | C02F 5/00 |
| | | | 210/650 |
| 2007/0215546 A1* | 9/2007 | Watkins | B01D 61/08 |
| | | | 210/652 |
| 2009/0230059 A1* | 9/2009 | McGuire | C02F 9/00 |
| | | | 210/638 |
| 2010/0230352 A1* | 9/2010 | Oklejas, Jr. | B01D 61/025 |
| | | | 210/652 |
| 2011/0309038 A1* | 12/2011 | Inoue | B01D 61/16 |
| | | | 210/791 |
| 2012/0255918 A1* | 10/2012 | DeSanto | C02F 1/444 |
| | | | 210/791 |
| 2013/0020248 A1* | 1/2013 | Mickan | B01D 29/52 |
| | | | 210/232 |
| 2013/0126431 A1* | 5/2013 | Henson | C02F 9/00 |
| | | | 210/638 |
| 2014/0131281 A1* | 5/2014 | Morikawa | B01D 65/02 |
| | | | 210/641 |
| 2016/0009582 A1* | 1/2016 | Heimel | C02F 1/441 |
| | | | 210/638 |
| 2016/0144301 A1* | 5/2016 | Tadlock | B01D 29/668 |
| | | | 210/234 |
| 2018/0111070 A1* | 4/2018 | Burrows | B01D 61/12 |
| 2019/0127236 A1* | 5/2019 | Zhou | C02F 1/008 |
| 2019/0233314 A1* | 8/2019 | Dentici | C02F 1/32 |
| 2021/0130211 A1* | 5/2021 | Douglas | C02F 5/083 |

* cited by examiner

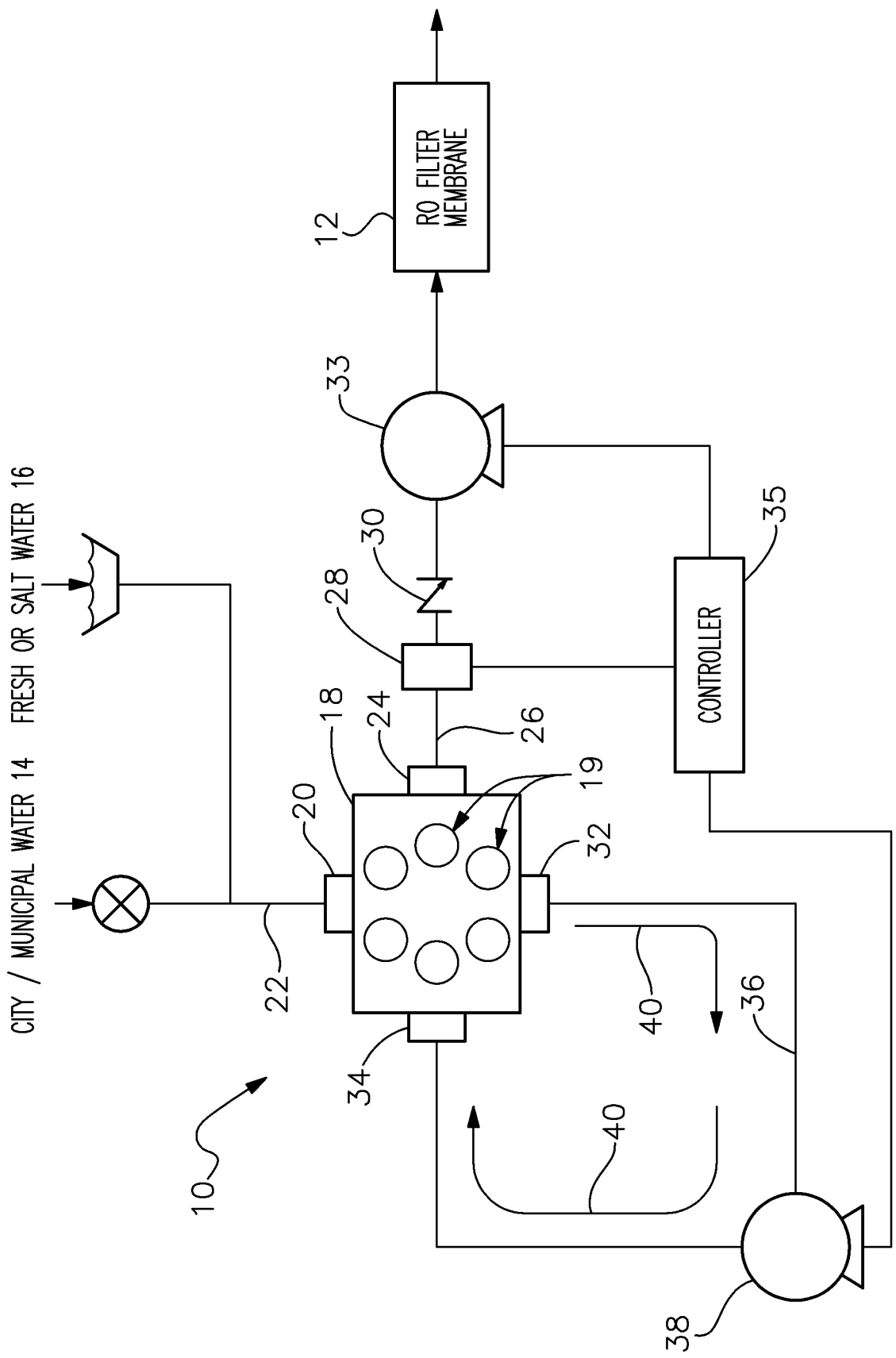

REVERSE OSMOSIS PREFILTER SYSTEM

RELATED APPLICATION

This application claims the benefit of U.S. Provisional Application Ser. No. 63/018,706 filed May 1, 2020.

FIELD OF THE INVENTION

This invention relates to a system for more effectively prefiltering water prior to processing the water by reverse osmosis filtration. More particularly, the invention relates a system wherein water is recirculated repeatedly and numerous times, through a prefilter to remove additional contaminants from the water on each pass through the prefilter before undergoing reverse osmosis.

BACKGROUND OF THE INVENTION

Reverse osmosis (RO) filtration is conventionally used to remove dissolved salts, as well as metals and other minute contaminants from water. Reverse osmosis systems are widely employed for desalinating sea water and filtering water from lakes, ponds, rivers and wells to produce fresh drinking water. RO systems can also be effectively utilized to remove trace contaminants from potable water so that the water is even safer to drink. Reverse osmosis filtration is likewise used extensively in the pharmaceutical, chemical and food industries, as well as in various other industrial applications requiring a filtered water supply, such as applications featuring boilers, irrigation equipment and evaporative cooling components.

RO filtration systems employ various types of surface and depth prefilter media to protect the RO membrane. Source water is pumped under pressure through the media to remove contaminants. Eventually however, the RO membrane becomes clogged and ineffective. Accordingly, it must be periodically cleaned using a chemical treatment process and eventually replaced. This can involve considerable effort and expense. In addition, the reverse osmosis system will typically be inconveniently out of service while cleaning and replacement are performed.

Although reverse osmosis is quite effective, it typically requires prefiltration of all solids (typically larger than 1-3 microns in size) to perform properly. Prefilters, such as step down filters, have been used to remove larger contaminants from the source water before it is subjected a final prefilter in advance of reverse osmosis. The purpose of such prefilters has been to prolong the useful life of the reverse osmosis membrane and therefore to reduce resulting costs. Although pre-filtration has helped to extend the service life of reverse osmosis filter membranes, the prefilters themselves introduce additional problems. Conventional step down filter cartridges are apt to become prematurely fouled and clogged. Accordingly, they must likewise be chemically cleaned at regular intervals and ultimately replaced. This usually requires that the operator of the RO system maintain a large supply of replacement prefilter cartridges, which can involve substantial inventory expense. Substantial storage space for the prefilters may also be needed. Once again, there can be significant costs and labor associated with having to frequently replace the prefilters.

A further problem with conventional step down RO prefilters is resolving conflicting cost considerations. Denser prefilter media better protect the RO membrane but can be very expensive. Coarser prefilter media are less costly but provide less protection for the RO membrane. As a result, more frequent membrane replacement is required and increased membrane costs are incurred.

SUMMARY OF THE INVENTION

It is therefore an object of the present invention to provide an inline water recirculating prefilter system for a reverse osmosis filtration unit, which significantly prolongs the service life of the RO filter membranes at less cost than is currently incurred using conventional step down prefilters.

It is a further object of this invention to provide an RO prefilter system that enables a reverse osmosis filtration unit to effectively and efficiently produce extremely pure and high quality filtered water for significantly longer periods of time and in increased amounts than are accomplished using conventional RO and RO prefilter systems and without requiring the frequent filter maintenance and replacement required by such prior systems.

It is a further object of this invention to provide a reverse osmosis prefilter system that significantly reduces the cost, labor, equipment downtime, inconvenience, and replacement filter inventory costs and storage space usually associated with maintaining RO filtration units.

It is a further object of this invention to provide a reverse osmosis prefilter that protects and prolongs the life of the RO membrane more effectively, efficiently and economically than conventionally available RO prefilters.

It is a further object of this invention to provide a water recirculating prefilter system for an RO unit, which is capable of recirculating incoming water at various selected flow rates and using different selected filter pore sizes and compositions so that various desired degrees of pre-filtration may be achieved in order to prolong the effective service life of the RO filter membrane.

It is a further object of this invention to provide a water recirculating prefilter system for an RO unit that permits the effective, efficient and economical use of less costly coarse filter media to protect and prolong the service of the RO membrane.

It is a further object of this invention to provide an RO prefilter system that provides for improved prefiltration of particulates using coarser, less costly filtration media and which thereby enables longer and more economically efficient use of denser RO membranes.

This invention features a water recirculating prefilter system for a reverse osmosis water clarification or filtration unit. The system includes a water recirculation chamber containing one or more prefilter cartridges. The recirculation chamber includes a source water inlet and a prefiltered water outlet. The recirculation chamber also includes a water recirculation inlet and a water recirculation outlet. The source water inlet is communicably connected to a water source. The water recirculation outlet is communicably interconnected to the water recirculation inlet through a water recirculation pump. The prefiltered water outlet is communicably connected to an inlet of the reverse osmosis filtration membrane an RO pump. In operation, source water is introduced into the recirculation chamber and recirculated repeatedly therethrough and through the prefilter cartridges in the chamber by the recirculation pump. The water is circulated and recirculated through the one or more prefilter cartridges and eventually discharged through the prefiltered water outlet. That prefiltered water is then pumped under pressure through the RO membrane, which removes smaller contaminants from the prefiltered water to produce RO membrane water for municipal saltwater desalination and consumption, medical use and many industrial purposes.

In preferred embodiments, the recirculation outlet and inlet are interconnected by appropriate pipes, tubes or conduits. The recirculation pump can be constructed and adjusted to produce a flow rate that is approximately five to fifty times or more that of the incoming flow rate of the water. It is especially preferred that a coarse depth filter media be employed for each prefilter cartridge in order to enhance the flow rate. Because there is less restriction in coarser depth filter media, the system permits more repetitive recirculation by the recirculation pump. A greater capacity for retained filtered solids is thereby achieved as the solid contaminants gradually collect in the depth filter media cartridge. A control valve and/or a check valve may be provided downstream of the prefilter outlet between the recirculation chamber and the RO pump. Various types of valves, timers and controllers may be incorporated into the system to adjust and regulate the water flow required by the system in particular applications.

BRIEF DESCRIPTION OF THE DRAWINGS

Other objects, features and advantages will occur from the following description of a preferred embodiment and the accompanying drawing, in which:

FIG. 1 is a schematic view of a water recirculating prefilter system in accordance with this invention for removing various solid contaminants and minute solid contaminants from a source water prior to reverse osmosis of the source water by an RO membrane unit.

DETAILED DESCRIPTION OF PREFERRED EMBODIMENTS

There is shown in FIG. 1 a water recirculating prefilter system 10 for use in combination with a standard RO filtration membrane 12. As used herein, RO should be understood to mean "reverse osmosis". The words and acronym are equivalent and may be used interchangeably within the scope of this invention. System 10 is designed to more effectively and efficiently remove solids and other relatively large saturated dissolved contaminants (typically greater than 1-3 microns in size) from a source water for other liquid before the water is treated by RO membrane 12. The RO membrane may comprise various types of filter membranes suitable for use in reverse osmosis filtering applications. The particular types of RO filter membranes employed are not limitations of this invention. System 10 is assembled inline between a water or other liquid source, which may comprise, for example, a city/municipal water source 14 or an unfiltered fresh or saltwater source 16, which may include streams, lakes, ponds, the ocean and other sources of water requiring filtration. The particular water source is not a limitation of this invention.

System 10 is installed inline between the water source 14, 16 and the RO membrane unit 12. In particular, system 10 includes a water recirculation chamber 18, which may have various sizes and configurations and which may be composed of assorted materials within the scope of this invention. The chamber may comprise various types of tanks, enclosures, reservoirs or containers. The chamber may also comprise a swimming pool. One or more RO prefilter cartridges 19 are disposed within the interior of recirculation chamber 18. Preferably cartridges 19 are connected in parallel to transmit water or other liquid through chamber 18. The prefilter cartridges may include different types of conventional filter media having assorted pore sizes. Surface filters and depth filters may be employed. Depending upon the viscosity of the liquid involved, and particularly when water is being filtered, relatively low pressure drop ($\Delta$ psi) depth filter cartridges are especially preferred. Cartridges 19 are arranged and mounted within chamber 18 in such a way that incoming source water passes in parallel through the cartridges to remove tiny solid particles therefrom. Preferably, cartridges 19 employ a coarser construction and larger pores than have been utilized in RO prefilters of the prior art. The benefit of such construction is described more fully below.

Chamber 18 further includes a source water inlet 20, which communicably connects the interior of chamber 18 and prefilter cartridges 19 disposed therein with a selected one of water sources 14 and 16. More particularly, each of city/municipal water 14 and fresh or saltwater source 16 is connected through an inlet pipe, tube or line 22 to chamber inlet 20, which in turn communicably connects the source water to prefilter cartridges 19 in a known manner.

A prefiltered water outlet 24 formed in chamber 18 is communicably connected to RO filter unit 12 through a prefiltered water discharge line 26. Both water source line 22 and prefiltered water discharge line 26 typically comprise various types of piping, tubing or other sorts of conduits that will be known to persons skilled in the art. A control valve 28, a check valve 30 and an RO pump 33, which will be understood to persons skilled in the art, are operably interconnected to prefiltered water discharge line 26 between outlet 24 of chamber 18 and RO filter unit 12. Operation of these components is described more fully below.

It is conventionally known to employ RO prefilters wherein prefilter cartridges supply prefiltered water to an RO membrane through operation of an RO pump, either by a continuous or batch process. The present invention improves the efficiency and clarification level of the prefiltration process by employing a uniquely configured recirculation chamber 18 and communicably interconnected recirculation pump 38 as described herein. In particular, recirculating chamber 18 employs a water recirculation outlet 32 and water recirculation inlet 34, which respectively communicate with the interior of chamber 18 and are communicably interconnected to one another by a water recirculation line 36. The recirculation line again comprises an appropriate type of pipe, tube or conduit for transmitting water between chamber outlet 32 and inlet 34. An offline recirculation pump 38 is operably connected to line 36 for drawing water out of chamber 18 through outlet 32, recirculating that water through line 36, and returning it to chamber 18 through inlet 34, in the manner indicated by arrows 40. Pump 38 may comprise a centrifugal pump utilizing an extremely energy efficient motor (e.g. 1725 rpm).

In operation, instead of water being delivered directly or through conventionally assembled stepdown prefilter cartridges to the RO membrane, water from a selected one of sources 14 and 16 is first introduced to recirculation chamber 18 through inlet 20. Respective valves 15 and 17 are operated to selectively connect one of water sources 14 and 16 to and isolate the other water source from recirculation chamber 18. Within chamber 18, incoming source water is prefiltered by cartridges 19 in a known manner. Unlike the prior art, the recirculation pump 38 communicably connected to chamber 18 is operated to repeatedly recirculate that prefiltered water at a high flow rate that can be anywhere from five to fifty times greater than the inline flow rate of the incoming source water. In particular, the recirculated water is drawn from chamber 18 through recirculation outlet 32 and line 36. See arrows 40. The water is then returned to chamber 18 though recirculation inlet 34 wherein the recirculated water is again passed through and processed by prefilter cartridges 19 to trap additional contaminants. Preferably, the source water then continues to be repeatedly recirculated a number of times in the foregoing manner through chamber 18 and cartridges 19. The preferably coarse media employed by cartridges 19 retains more solids from the water on each successive recirculating pass. On each such pass through the prefilter cartridges, progressively smaller particles are trapped. Accordingly, after multiple passes, a much greater percentage of the solid material is stopped and removed from the source water before it is delivered to the RO membrane 12 than has been eliminated by standard prefilters. This significantly reduces the work normally required of the RO filter membrane, which, as a result, extends the service life of the filter commensurately. When a greater percentage of the solids previously transmitted to the RO membrane is retained in the recirculating chamber prefilter cartridges, the life of the RO membranes is proportionally extended.

The amount of solids removed by the recirculating prefilter system may be adjusted by adjusting the recirculating flow rate and the flow rate across the prefilter media. The installer should carefully consider and select the appropriate number of filter cartridges in relation to the flow velocity and recirculation time to achieve a desired level of particulate removal. The pore size, composition and retention rate of the prefilter cartridge media may also be varied to achieve a desired level of prefilter solid retention. The user should evaluate the level of solids in the water when making those selections. The use of coarser media provides the prefilter cartridges with an increased capacity to retain solids at reduced flow rates. Slightly coarser media offers increased flow during recirculation. This, in turn, increases particulate retention, which improves water clarity and better protects the RO membrane. Coarser media not only hold more solids, they cost less than denser media and result in less filter media having to be eventually disposed to waste. In addition, because coarse filter media at reduced velocity of flow block increased amounts of solids over multiple passes, RO membranes having a smaller porosity are required to perform less filtration and their service life is extended. Denser membranes are also better able to trap extraneous particles that may bypass the prefilter chamber during valve activation.

Operation of the recirculation pump 38, the RO pump 33 and the various valves described above may be controlled and adjusted by an electronic controller 35, which is programmed to direct the system to deliver prefiltered water from chamber 18 to RO unit 12 in a desired (i.e. batch) manner and/or in a selected sequence. For example, while recirculation is occurring, control valve 28 may remain closed and/or pump 33 may be deactivated so that source water is not delivered to the RO filter 12. Alternatively, the pumps may run concurrently. After recirculation has been performed for a predetermined or desired time, valve 28 may be opened and pump 33 operated, typically at 300-600 psi, to draw the prefiltered water outwardly from chamber 18 through discharge outlet 24 and via line 26 to RO filter membrane 12. A check valve 30 prevents backflow of the prefiltered water into the recirculating chamber. RO pump may also be run to draw prefiltered water continuously from chamber 18.

Water recirculation prefilter system 10 operates to more effectively remove solids and dissolved contaminant particles from the water, which would otherwise prematurely clog the pores and hinder operation of RO filter membrane 12. Preferably, the prefilter cartridges have a filtering capacity that operates in conjunction with multiple recirculating passes of the source water through the prefilters to retain increased amounts of the conventionally missed solids in the source water. As a result, the service life of the reverse osmosis membrane is extended in an economically advantageous fashion. Recirculating the prefiltered water as disclosed herein and using recirculation pressures to achieve flow rates much greater than the flow rate of the source water entering the recirculation chamber provides for significant benefits. The inline flow rate of the source water is typically increased significantly by the recirculation pump so that increased pre-filtration is achieved. For example, the flow rate of source water having a nominal inline flow rate of 10 gallons per minute may be increased approximately five to many more times by selecting the size and pressure (psi) performance capacity of recirculation pump 38. Flow rates can also be increased by employing coarser depth filter media. Such depth filters typically operate at a low pressure of 1-20 psi, which can increase to 40 psi or greater in cold water environments. Less restrictive filtration media provides for a greater level of repetitive recirculation by pump 38 without restricting the inline flow. As the flow increases due to the use of coarse prefilter medias, filtration/particulate collection by cartridges 19 likewise increases. This results in improved retention of particulates and eventually improved collection of even smaller particle sizes, which typically occurs as increasingly smaller particles are trapped when the coarse filter pores become filled. Because the system traps an increased amount of small solids and even dissolved particles, the RO membrane 12 does not have to work nearly as hard as RO filters using known prefilters in order to collect such contaminants. RO filter membrane life is thereby significantly increased, maintenance and replacement costs are reduced and a high quality and extremely pure filtered water product is achieved. In addition, because relatively low filter pressure drops are encountered, the recirculation pump does not have to work as hard to provide an effective flow rate and can utilize a more efficient lower capacity motor. This reduces energy costs, as well as potential pump repair and replacement expenses.

It should further be understood that the system of this invention may also be integrated into and used in conjunction with a plurality of serially interconnected stepdown prefilters of the type employed in existing RO systems. In such embodiments, each stepdown filter employs a prefilter system as depicted in FIG. 1. Specifically, each such prefilter system includes a recirculation chamber 18 having a water inlet 20 and a prefiltered water outlet 24, as well as a recirculation inlet 32 and recirculation outlet 34. Each such chamber includes one or more cartridges 19 containing a suitable, and preferably coarse prefilter media. The recirculation chambers may be serially interconnected in a manner analogous to conventional stepdown prefilters. The inlet 20 of a first recirculation chamber in the series is connected to the source water and the prefiltered water outlet 24 of the last recirculation chamber in the stepdown series is communicably connected to an RO membrane 12. In addition, each recirculation chamber is operably connected to a respective recirculation pump 38 for recirculating water through the corresponding chamber 18 from outlet 32 to inlet 34. The filter media cartridges in each successive recirculation chamber may include a pore size for retaining successively smaller sizes of particulates (e.g. 20 microns to 10 microns to 5 microns, respectively). Various pore sizes may be employed within the scope of this invention. Additional components including an RO pump 33, FIG. 1, a valve 28 and electronic controls are typically utilized to transmit water through the successive stepdown prefilters as previously described. As previously indicated, each recirculation chamber is operably connected to its own recirculation pump. Additional valves, pumps and controls may be employed intermediate, prior to, and/or following any or all of the successive recirculation chambers in the series of stepdown prefilters and these devices may be programmed and operated to transmit water through the series of stepdown filters and to the RO filter membrane in a manner designed to achieve a desired particulate retention and resulting water clarity.

The system of this invention achieves significantly improved water clarification and efficiently produces a pure filtered water suitable for many other uses. Medical laboratories will be able to effectively utilize the filter effluent in disease research and development of vaccines. The filtered water is beneficial for use in a variety of industrial and many other applications.

Although specific features of the invention are shown in some of the drawings and not others, this is for convenience only, as each feature may be combined with any and all of the other features in accordance with this invention.

What is claimed is:

1. A water recirculating prefilter system for removing solid materials from water derived from a water source and delivering prefiltered water to a reverse osmosis (RO) filtration unit, said prefilter system comprising:
   a water recirculation chamber containing multiple prefilter cartridges connected in parallel within said recirculation chamber, said recirculation chamber having a source water inlet for communicably connecting to the water source and introducing the source water into said recirculation chamber; said recirculation chamber further having a prefiltered water outlet for communicably interconnecting to the reverse osmosis filtration unit; said recirculation chamber further including a water recirculation outlet and a water recirculation inlet that are communicably interconnected through a water recirculation pump, said water recirculation inlet being formed in said chamber separate and distinct from said source water inlet, and said water recirculation outlet being formed in said chamber separate and distinct from said prefiltered water outlet;
   a valve interconnected between said prefiltered water outlet of said recirculation chamber and the reverse osmosis filter unit; and
   control means for adjusting and controlling operation of said recirculation pump and said valve such that all source water introduced into said recirculation chamber through said source water inlet is recirculated multiple times to flow and pass repeatedly through said recirculation chamber and through said multiple prefilter cartridges to remove solid materials from the source water on each successive pass therethrough, said control means selectively operating said valve to discharge the recirculated water as prefiltered water through said prefiltered water outlet and transmit the prefiltered water to the reverse osmosis filtration unit for further filtration to produce reverse osmosis filtered water; each said prefilter cartridge including a coarse depth filter media that removes successively smaller materials on each successive pass of the source water through said multiple prefilter cartridges.

2. The system of claim 1 in which the source water has an incoming flow rate at said source water inlet and said control means directs said recirculation pump to produce a flow rate through said recirculation chamber that is at least five and, not more than fifty times said incoming flow rate.

3. The system of claim 1 in which said water recirculation chamber consists of an enclosure containing multiple depth filter cartridges connected in parallel and with a single said source water inlet, a single said prefiltered water outlet, a single said water recirculation inlet and a single said water recirculation outlet formed in said enclosure such that all source water passing through said depth filter cartridges in said chamber is recirculated repeatedly through said recirculation chamber by said recirculation pump and discharged as prefiltered water through said single prefiltered water outlet.

4. The system of claim 1 in which said control means includes an electronic controller.

5. The system of claim 1 in which said control means selectively closes said valve during recirculation of said source water through said recirculation chamber and open said valve to discharge prefiltered water through said prefiltered water outlet.

6. A reverse osmosis (RO) filtration system for removing solid materials from water derived from a water source, said system comprising:
   an RO filtration unit; and
   a water recirculation prefilter system, said water recirculation prefilter system including a water recirculation chamber that contains a plurality of prefilter cartridges connected in parallel within said recirculation chamber, said recirculation chamber having a source water inlet for communicably connecting to the water source and introducing the source water into said recirculation chamber; said recirculation chamber further having a prefiltered water outlet communicably interconnected to an inlet of said reverse osmosis filtration unit through a reverse osmosis pump; said recirculation chamber further including a water recirculation outlet and a water recirculation inlet that are communicably interconnected through a water recirculation pump, said water recirculation inlet being formed in said chamber separate and distinct from said source water inlet and said prefiltered water outlet being formed in said chamber separate and distinct from said water recirculation outlet;
   a valve interconnected between said prefiltered water outlet of said recirculation chamber and said reverse osmosis filter unit; and
   control means for adjusting and controlling operation of said recirculation pump and said valve such that all source water introduced into said recirculation chamber through said source water inlet is recirculated multiple times by said water recirculation pump to flow and pass repeatedly through said recirculation chamber and through said prefilter cartridges to remove solid materials from the source water on each successive pass therethrough; said control means selectively operating said valve to discharge the recirculated water as prefiltered water through said prefiltered water outlet, and the prefiltered water being pumped by said reverse osmosis pump through said reverse osmosis filtration unit to remove additional solid materials from the prefiltered water and produce reverse osmosis filtered water; each said prefilter cartridge including a coarse depth filter media that removes successively smaller solid materials on each successive pass of the source water through said multiple prefilter cartridges.

7. The system of claim 6 in which the source water has an incoming flow rate at said source water inlet and said control means directs said recirculation pump to produce a flow rate through said recirculation chamber that is at least five and not more than fifty times said incoming flow rate.

8. The RO filtration system of claim 6 further including means for controlling said valve and said reverse osmosis pump to regulate delivery of the prefiltered water from said recirculation chamber to said reverse osmosis filtration unit.

9. The RO filtration system of claim 6 in which said control means include an electronic controller.

10. The system of claim 6 in which said water recirculation chamber consists of an enclosure containing multiple depth filter cartridges connected in parallel and with a single said source water inlet, a single said prefiltered water outlet, a single said water recirculation inlet and a single said water recirculation outlet formed in said enclosure such that all source water passing through said depth filter cartridges in said chamber is recirculated repeatedly through said recirculation chamber by said recirculation pump and discharged as prefiltered water through said single prefiltered water outlet.

11. The system of claim 6 wherein said control means direct said recirculation pump, said valve and said reverse osmosis pump to deliver prefiltered water from said recirculation chamber to said RO filtration unit after the water is recirculated in said RO filtration chamber for a predetermined time.

12. The system of claim 6 in which said control means selectively closes said valve during recirculation of said source water through said recirculation chamber and open said valve to discharge prefiltered water through said prefiltered water outlet.

13. A water recirculating prefilter system for removing solid materials from water derived from a water source and delivering prefiltered water to a reverse osmosis (RO) filtration unit, said prefilter system comprising:
  a water recirculation chamber containing multiple prefilter cartridges connected in parallel within said recirculation chamber, said recirculation chamber having a source water inlet for communicably connecting to the water source and introducing the source water into said recirculation chamber; said recirculation chamber further having a prefiltered water outlet for communicably interconnecting to the reverse osmosis filtration unit; said recirculation chamber further including a water recirculation outlet and a water recirculation inlet that are communicably interconnected through a water recirculation pump, said water recirculation inlet being formed in said chamber separate and distinct from said source water inlet, and said water recirculation outlet being formed in said chamber separate and distinct from said prefiltered water outlet;
  a valve interconnected between said prefiltered water outlet of said recirculation chamber and the reverse osmosis filter unit; and
  control means for adjusting and controlling operation of said recirculation pump and said valve such that all source water introduced into said recirculation chamber through said source water inlet is recirculated multiple times to flow and pass repeatedly through said recirculation chamber and through said multiple prefilter cartridges to remove solid materials from the source water on each successive pass therethrough, said control means selectively operating said valve to discharge the recirculated water as prefiltered water through said prefiltered water outlet and transmit the prefiltered water to the reverse osmosis filtration unit for further filtration to produce reverse osmosis filtered water; the source water having an incoming flow rate at said source water inlet and said control means directing said recirculation pump to produce a flow rate through said recirculation chamber that is at least five and not more than fifty times said incoming flow rate.

14. The system of claim 13 in which each prefilter cartridge includes a coarse depth filter media that removes successively smaller solid materials on each successive pass of the source water through said multiple prefilter cartridges.

15. The system of claim 13 in which said water recirculation chamber consists of an enclosure containing multiple depth filter cartridges connected in parallel and with a single said source water inlet, a single said prefiltered water outlet, a single said water recirculation inlet and a single said water recirculation outlet formed in said enclosure such that all source water passing through said depth filter cartridges in said chamber is recirculated repeatedly through said recirculation chamber by said recirculation pump and discharged as prefiltered water through said single prefiltered water outlet.

16. The system of claim 13 in which said control means includes an electronic controller.

17. The system of claim 13 in which said control means selectively closes said valve during recirculation of said source water through said recirculation chamber and open said valve to discharge prefiltered water through said prefiltered water outlet.

* * * * *